S. L. BEAN.
Millstone Exhaust Apparatus.
No. 207,585. Patented Sept. 3, 1878.
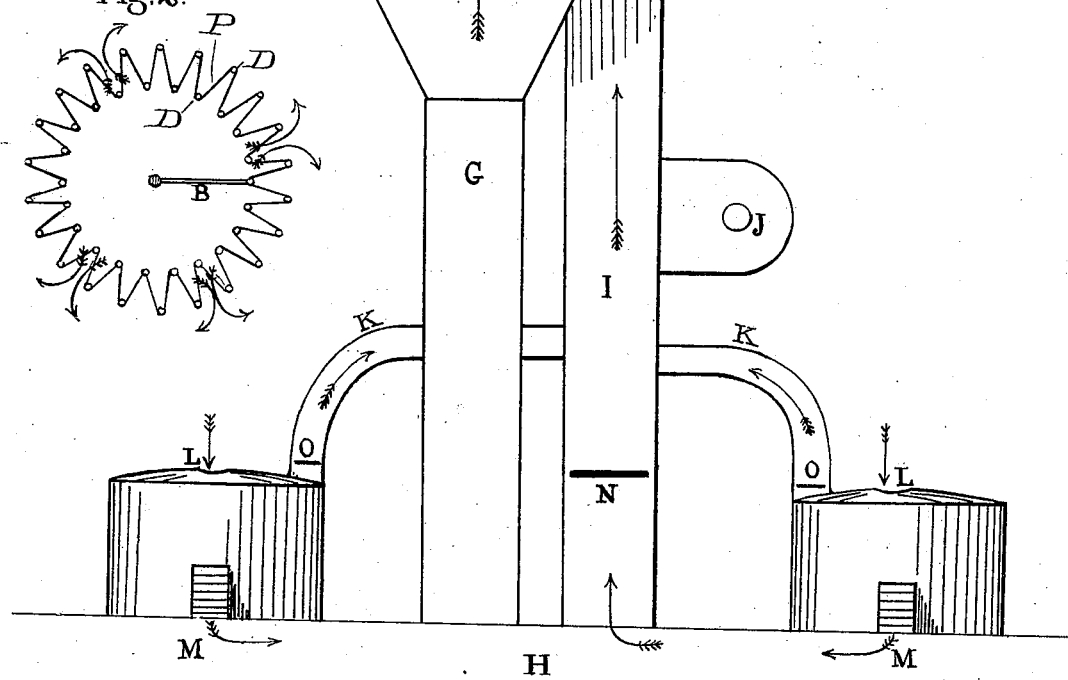

UNITED STATES PATENT OFFICE.

SAMUEL L. BEAN, OF WASHINGTON, DISTRICT OF COLUMBIA.

IMPROVEMENT IN MILLSTONE-EXHAUST APPARATUS.

Specification forming part of Letters Patent No. 207,585, dated September 3, 1878; application filed July 16, 1878.

*To all whom it may concern:*

Be it known that I, SAMUEL L. BEAN, of Washington, in the District of Columbia, have invented a new and useful Improvement in Millstone-Exhaust Apparatus, of which the following is a specification:

This invention relates to the application of currents of air to grinding-stones in flouring-mills, whereby the temperature of the stones and the meal ground may be regulated at will by the miller, as required, according to the style of milling done and condition of wheat to be ground.

It is a well-known fact that different varieties of wheat require different treatment in grinding, and the same is also true of any one variety containing different degrees of moisture, and at different seasons of the year when the temperature is either high or low. For instance, in extremely cold weather, to effect a reasonable reduction of the wheat into flour, the bran breaks up from the friction under the face of the stones to a far greater extent, and the chop, being cold, is bolted far more quickly through a bolt having a given number of mesh and extent of surface, and the flour is rendered more liable to become specky and reduced in quality than in warmer weather. In extremely hot weather the ground meal becomes far more heated and sticky, and the flour bolted will be too fine on the same numbers of cloth that were sufficiently coarse for proper bolting in cold weather, while the surface of cloth required is so much greater that it frequently occurs there is not a sufficient amount in the mill to bolt all the fine flour out of the middlings and offal.

Under all circumstances, in the usual method of milling, there is a great loss to the miller, resulting from evaporation and the rising dust, which, being good flour at first, settles upon the mill-floor and becomes so mixed with dirt as to be of no value except as it is sold for the lowest grade of feed. There is also great loss occasioned by the condensation of vapor upon the inside of the curbs and spouts while grinding, and to which the flour adheres, forming a dough, which soon becomes sour and partially decomposed in the heat, and is worthless for even feed. Great inconvenience, and frequently loss, is occasioned to the miller by this dough detaching in partially-dried masses, and so large that when they pass to the bolt-reels cut and tear the cloths from their great weight. This moisture generated in grinding has the effect to increase the friction on the face of the stones, and requires a large per cent. greater power to grind a given amount of wheat than with properly-regulated currents of air, by which the chop and stones are kept dry and cool.

By this invention nearly all of the evaporation in grinding is prevented. The dust lost in sweepings is collected entirely free from dirt and automatically returned to the flour, while all the condensation of vapor and formation of dough on the inside of the curbs and spouts are prevented, by which loss and danger to the bolt-cloths are obviated, and the power required to grind very much lessened.

This invention, to the end of overcoming the above objections, consists in certain arrangements of the pipes and fan and regulating-valves connecting the curb of a millstone with the dust-chamber or the conveyers to the same, as hereinafter described, and more particularly pointed out in the claims.

The returns or flour-dust may be sent to a conveyer, or any spout through which the flour passes, or directly to the bolts. I have shown it to the conveyer.

In the annexed drawings, forming a part of this specification, A, Figure 1, represents the pulley by which the knocker B, attached to an upright shaft, C, is operated. D D D represent some of the upright bars around which the cloth is worn.

Fig. 2 represents a vertical sectional view of the balloon or dust-collecting chamber, showing the position of the bars and the cloth attached thereon.

F represents the funnel or hopper shaped bottom of the balloon, in which the flour-dust is collected and returned automatically down the spout G to the conveyer H, or other suitable receptacle. I represents the suction-spout, through which the currents of air, with their flour-dust, are drawn to the balloon in both downward currents through the curbs, stones, and chop-spouts, as well as the upward currents from the tops of the curbs, creating a vacuum at the face of the stones. J represents the fan creating the currents of air drawn up the suction-spout I to the balloon. K K represent the spouts from the tops of the curbs, connected with the suction-spout I, and by which a division of currents is produced. L L represent the curbs, from which the spouts K K draw their air. M M represent the chop-spouts, through which the ground meal passes from the stones to the conveyer H. N and O represent adjustable slides in spouts I and K, by which the division of currents of air, upward and downward, is effected at the will and discretion of the miller. P represents the cloth, arranged on the upright bars D D, by which the flour is strained from the currents of air.

The devices I have described I prefer on account of their simplicity and facility of operation.

I do not claim to be the inventor of the use of cloth to strain flour from currents of air, or of corrugated surfaces; but I do claim the construction of a balloon with the cloth arranged cylindrically and at angles, to entirely exclude the meeting of hot and cold currents of air upon any part of its surface, the largest possible air-escaping surface in the smallest space, and automatic means for keeping the cloth clean, and regular and constant discharge of flour from the balloon.

What I claim as my invention, and desire to secure by Letters Patent, is—

1. In combination with an exhaust-fan, one or more millstone-curbs, having top and bottom air-conducting spouts, provided with valves, substantially as set forth, whereby the air-currents are regulated, controlled, and reversed at will, to produce a partial vacuum at the grinding-surfaces of the stones.

2. In combination with a fan for producing air-currents, a cylindrical balloon or dust-chamber, provided with a knocker, and having a corrugated screen-surface, whereby the dust is retained, and an outside wall of partially-heated air is produced to prevent condensation, substantially in the manner as described.

In testimony that I claim the foregoing as my own I affix my signature in presence of two witnesses.

SAML. L. BEAN.

Witnesses:
   GEO. M. LOCKWOOD,
   D. P. COWL.